(12) United States Patent
Hirano (10) Patent No.: US 11,794,818 B2
(45) Date of Patent: Oct. 24, 2023

(54) COWL COVER APPARATUS

(71) Applicant: NIHON PLAST CO., LTD., Fujinomiya (JP)

(72) Inventor: Masanori Hirano, Shizuoka (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 26 days.

(21) Appl. No.: 17/558,658

(22) Filed: Dec. 22, 2021

(65) Prior Publication Data

US 2022/0250689 A1 Aug. 11, 2022

(30) Foreign Application Priority Data

Feb. 10, 2021 (JP) ................................. 2021-019619

(51) Int. Cl.
  *B62D 25/08* (2006.01)
(52) U.S. Cl.
  CPC ................................. *B62D 25/081* (2013.01)
(58) Field of Classification Search
  CPC .................................................. B62D 25/081
  USPC ....................................................... 296/192
  See application file for complete search history.

(56) References Cited

U.S. PATENT DOCUMENTS 11,067,109 B2 * 7/2021 Horimizu .............. F16B 5/0664

FOREIGN PATENT DOCUMENTS

| JP | 2008-247223 | | 10/2008 | |
|---|---|---|---|---|
| JP | 4852462 B2 | * | 1/2012 | |
| JP | 2018-199376 | * | 12/2018 | |
| JP | 6821642 B2 | * | 1/2021 | ............. B60R 13/07 |

OTHER PUBLICATIONS

English language translation of JP 4852462 B2. (Year: 2012).*

* cited by examiner

*Primary Examiner* — Joseph D. Pape
(74) *Attorney, Agent, or Firm* — AMIN, TUROCY & WATSON, LLP (57) ABSTRACT

A cowl cover apparatus includes a cowl cover that covers a cowl portion, a vertical wall body detachably attached to the cowl cover and being positioned while rising with respect to the cowl cover in a state of being attached thereto. The vertical wall body includes an insertion portion in an end portion in a vehicle width direction. The cowl cover includes a regulation portion into which the insertion portion is partly inserted in the vehicle width direction. The insertion portion is formed to be elastically deformable in the vehicle width direction due to a reaction force from the cowl cover against a load onto the vertical wall body in a predetermined direction intersecting the vehicle width direction.

4 Claims, 5 Drawing Sheets

COWL COVER APPARATUS

Japanese Patent Application No. 2021-019619 filed on Feb. 10, 2021, including description, claims, drawings, and abstract the entire disclosure is incorporated herein by reference in its entirety.

TECHNICAL FIELD

The present invention relates to a cowl cover apparatus including a vertical wall body detachably attached to a cowl cover covering a cowl portion.

BACKGROUND ART

Heretofore, cowl covers each covering a so-called cowl portion to enhance the external appearance have been used. Such a cowl cover is placed over the cowl portion between a front end portion of a front glass serving as a windshield of an automobile and a rear side portion of a hood, which is a counterpart member of the front glass.

A vertical wall body extending in a vehicle width direction and used for preventing rainwater or snow and/or the like from entering into an engine compartment is attached to an upper portion of the cowl cover. Such a vertical wall body includes a lock portion provided in a protruding manner on a flange-shaped support portion for fall prevention and is locked to the cowl cover while this lock portion is fittingly inserted into a lock hole of the cowl cover (see, e.g., Patent Literature (hereinafter, referred to as "PTL") 1).

CITATION LIST

Patent Literature

PTL 1
Japanese Patent Application Laid-Open No. 2008-247223 (Page 5 and FIG. 7)

SUMMARY OF INVENTION

Technical Problem

With the configuration described above, however, repeated accumulation of snow and removal of the snow on the vertical wall body possibly causes deformation of the lock portion, resulting in degradation in visual quality.

The present invention has been made taking the above mentioned points into consideration and aims at providing a cowl cover apparatus capable of securing quality of locking between a cowl cover and a vertical wall body and keeping visual quality and the locking of the vertical wall body with respect to the cowl cover for a long time.

Solution to Problem

A cowl cover apparatus according to a first aspect includes: a cowl cover that covers a cowl portion; and a vertical wall body detachably attached to the cowl cover, the vertical wall body being positioned while rising with respect to the cowl cover in a state of being attached to the cowl cover. In the cowl cover apparatus, the vertical wall body includes an insertion portion in an end portion of the vertical wall body in a vehicle width direction, and the cowl cover includes a regulation portion into which the insertion portion is partly inserted. In the cowl cover apparatus, the insertion portion is formed to be elastically deformable in the vehicle width direction due to a reaction force from the cowl cover against a load onto the vertical wall body in a predetermined direction intersecting the vehicle width direction.

A cowl cover apparatus according to a second aspect includes, in the cowl cover apparatus according to the first aspect, the insertion portion includes: a first arm portion extending in a predetermined direction intersecting the vehicle width direction; and a second arm portion extending from an end portion of the first arm portion in the vehicle width direction to be placed into the regulation portion. In the cowl cover apparatus, the second arm portion includes a stopper portion extending from a distal end portion of the second arm portion in a front and rear direction, and the cowl cover includes: a coming-off prevention portion facing the stopper portion in the vehicle width direction, and an abutment portion facing an end portion of the first arm portion in the predetermined direction.

A cowl cover apparatus according to a third aspect includes, in the cowl cover apparatus according to the second aspect, the end portion of the first arm portion is inclined in the vehicle width direction toward the regulation portion and faces the abutment portion in the predetermined direction intersecting the vehicle width direction.

A cowl cover apparatus according to a fourth aspect includes, in the cowl cover apparatus according to the second or third aspect, the stopper portion is formed to extend laterally in the predetermined direction intersecting the vehicle width direction with respect to the distal end portion of the second arm portion, and a lateral portion of the stopper portion on a side of the regulation portion is inclined so as to gradually separate from the regulation portion toward the predetermined direction from the second arm portion.

Advantageous Effects of Invention

With the cowl cover apparatus according to the first aspect, regulating the position of the insertion portion by the regulation portion in the predetermined direction intersecting the vehicle width direction makes it possible to secure the quality of locking between the cowl cover and the vertical wall body in an ordinary attachment state. When a load is applied to the vertical wall body in a predetermined direction, the insertion portion elastically deforms in the vehicle width direction due to a reaction force from the cowl cover, and thus, the load can be released in the vehicle width direction while the insertion portion remains inserted into the regulation portion in the vehicle width direction. For this reason, it can be made harder for the vertical wall body to come off from the cowl cover, and in the state where the load is released, the deformation of the insertion portion for restoration allows the cowl cover and the vertical wall body to be re-locked with each other. Accordingly, it is made possible to suppress deformation of the insertion portion with time and to keep the visual quality and the locking of the vertical wall body with respect to the cowl cover for a long time.

With the cowl cover apparatus according to the second aspect, in addition to the effects brought about by the cowl cover apparatus according to the first aspect, when a load is applied to the vertical wall body in a predetermined direction intersecting the vehicle width direction, the first arm portion abuts on the abutment portion and is taken into the regulation portion due to its reaction force while elastically deforming in the vehicle width direction. The stopper portion then separates from the coming-off prevention portion, thereby making it possible to effectively release the load.

With the cowl cover apparatus according to the third aspect, in addition to the effects brought about by the cowl cover apparatus according to the second aspect, when a load is applied to the vertical wall body in the predetermined direction intersecting the vehicle width direction, the first arm portion easily deforms to as to be easily taken into the regulation portion due to the reaction force from the abutment portion.

With the cowl cover apparatus according to the fourth aspect, in addition to the effects brought about by the cowl cover apparatus according to the second or the third aspect, when a load is applied to a vehicle body due to a collision with an obstacle, the vertical wall body easily comes off from the cowl cover, thus, making it possible to suppress a reaction force against the obstacle.

DESCRIPTION OF EMBODIMENTS

Hereinafter, a description will be given of Embodiment 1 of the present invention with reference to the drawings.

Figure 6:
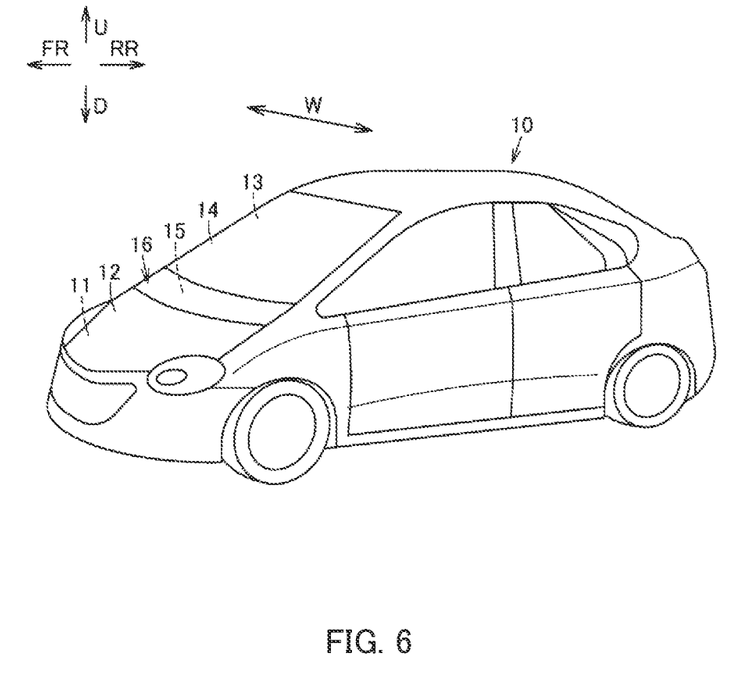
FIG. 6 a perspective diagram illustrating a vehicle body including the above cowl cover apparatus.

In FIG. 6, reference numeral 10 denotes a vehicle body of an automobile, which is a vehicle, and cowl cover apparatus 16 is installed in vehicle body 10. Cowl cover apparatus 16 covers cowl portion 15 between hood 12 covering engine compartment 11, and front glass 14 serving as a windshield positioned on a front side of vehicle interior 13. Note that, hereinafter, directions, such as front and rear, up and down, as well as both sides are described with reference to a forward traveling direction of vehicle body 10, and the direction indicated by arrow FR refers to forward or front, the direction indicated by arrow RR refers to rearward or rear, the direction indicated by arrow U refers to up or upper, the direction indicated by arrow D refers to down or lower, and the direction indicated by arrow W refers to a vehicle width direction which is the both side direction.

Cowl portion 15 is also referred to as an air box or the like and is formed in an open-top tub shape by a cowl top panel serving as a vehicle body member formed of an iron plate, for example. An air intake portion of an air conditioner for introducing outside air into vehicle interior 13 is connected to cowl portion 15, while a motor for driving wiper arms of wipers and/or wiper links, for example, are placed on one side of cowl portion 15.

Hood 12 is a bonnet hood located at a front portion of vehicle body 10 and openably covering engine compartment 11.

Figure 4:
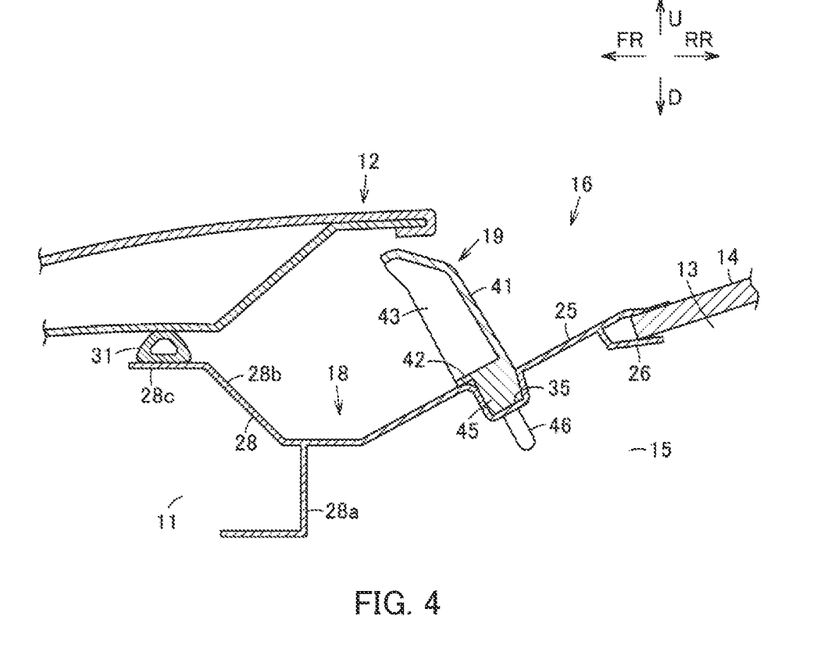
FIG. 4 is a cross-sectional view of the above cowl cover apparatus.
Figure 5:
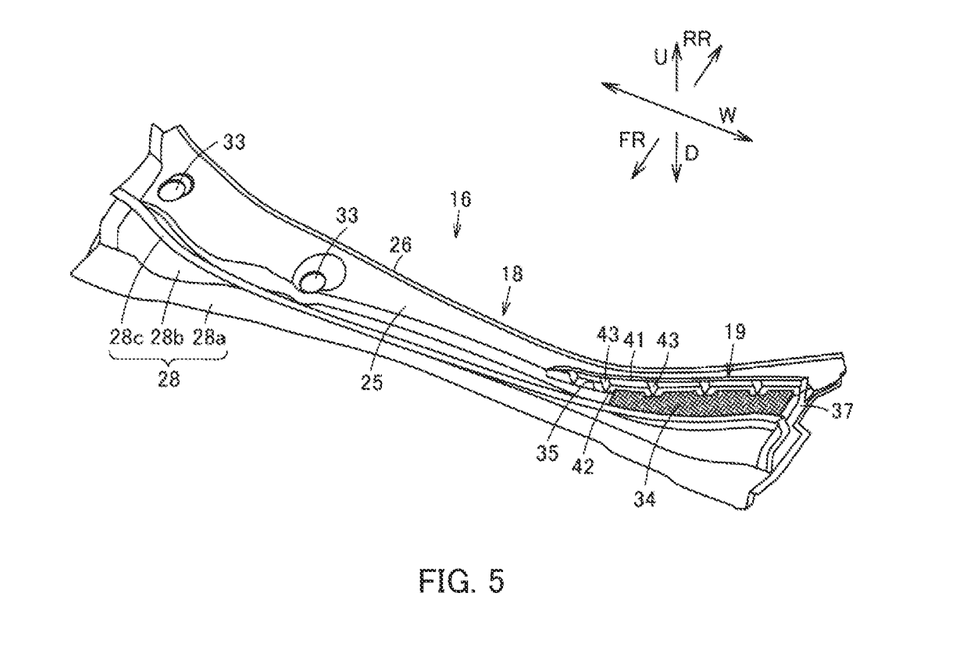
FIG. 5 is s a perspective view of the above cowl cover apparatus.

Cowl cover apparatus 16 illustrated in FIGS. 4 and 5 includes cowl cover 18 and vertical wall body 19 detachably attached to cowl cover 18. Cowl cover apparatus 16 covers cowl portion 15 between front glass 14 and hood 12, that is, an upper side of a cowl top panel to enhance the visual quality while serving as a partition between cowl portion 15 and engine compartment 11.

Cowl cover 18 is also called a cowl top cover and is formed in a longitudinal shape with a material, such as a synthetic resin harder than vertical wall body 19, e.g., polypropylene (PP). Cowl cover 18 is placed along a vehicle width direction with a longitudinal direction of cowl cover 18. Cowl cover 18 adopts an appropriate shape in accordance with a shape(s) of engine compartment 11 and/or hood 12, and placement of wipers; however, in Embodiment 1, basically, owl cover 18 is placed while the longitudinal direction of cowl cover 18 is set along the vehicle width direction and adjacent to a front edge portion of front glass 14.

Cowl cover 18 includes cover main body 25. Cover main body 25 is formed to be inclined substantially parallel to front glass 14 and adjacent to front glass 14 in the longitudinal direction. Further, holding portion 26 is provided in a protruding manner on a rear portion of cover main body 25 which faces front glass 14. Holding portion 26 is a portion to receive the front edge portion of front glass 14 with cover main body 25 in between. Holding portion 26 is provided in a protruding manner rearward from a lower portion of cover main body 25. Holding portion 26 may be formed to extend over an entirety of a rear edge portion of cover main body 25 or formed at a plurality of positions intermittently in the longitudinal direction of cowl cover 18.

Cover main body 25 includes shielding portion 28. Shielding portion 28 extends out in an up and down direction from a front edge portion of cover main body 25. Shielding portion 28 is supported by a vehicle body member at a lower portion of shielding portion 28 and forms a wall surface serving as a partition between engine compartment 11 and cowl portion 15 in front and rear. In Embodiment 1, shielding portion 28 includes lower-part shielding portion 28a extending downward from cover main body 25, upper-part shielding portion 28b extending upward from cover main body 25, and hood seal face portion 28c extending from upper-part shielding portion 28b.

Lower-part shielding portion 28a extends downward from a front end portion of cover main body 25 while a distal end portion of lower-part shielding portion 28a is bent forward. Lower-part shielding portion 28a is overlapped with and fixed to the vehicle body member, using a fixing member, such as a bolt.

Upper-part shielding portion 28b extends upwardly forward in an inclined shape from the front end portion of cover main body 25.

Hood seal face portion 28c is formed to extend planarly forward from the front end portion of upper shielding portion 28b. Hood seal 31 to be in pressure-contact with a rear lower surface of hood 12 is attached to an upper portion of hood-seal face portion 28c. Accordingly, hot-air and order from engine compartment 11 are blocked by hood seal 31 being in liquid-tight contact with hood 12 in a closed state.

Cover main body 25 includes wiper pivot holes 33 through which shafts of wipers pass and which are formed in one end portion of cover main body 25 in the longitudinal direction, i.e., in one side portion thereof in the vehicle width direction.

Furthermore, cover main body 25 includes air inlet 34 formed in the other end portion of cover main body 25 in the longitudinal direction, i.e., in the other side portion thereof in the vehicle width direction. Air inlet 34 is also called an air intake and allows outside air to be introduced into cowl portion 15. In Embodiment 1, air inlet 34 is formed in a grid shape (or mesh shape), for example.

Cover main body 25 includes groove portion 35 to which a lower end portion of vertical wall body 19 is detachably attached. Groove portion 35 is formed to extend in the longitudinal direction of cover main body 25. More specifically, groove portion 35 is formed to extend in the vehicle width direction. In Embodiment 1, groove portion 35 extends from the other end portion of cowl main body 25 (cowl cover 18) in the longitudinal direction to a position close to the other end portion relative to a center portion in the longitudinal direction. In the illustrated example, groove portion 35 is located in a position close to the other side portion of cover main body 25 (cowl cover 18) in the vehicle width direction. Groove portion 35 is a groove having a U-shape in cross-section. Groove portion 35 is formed along a rear portion of air inlet 34.

Figure 1:
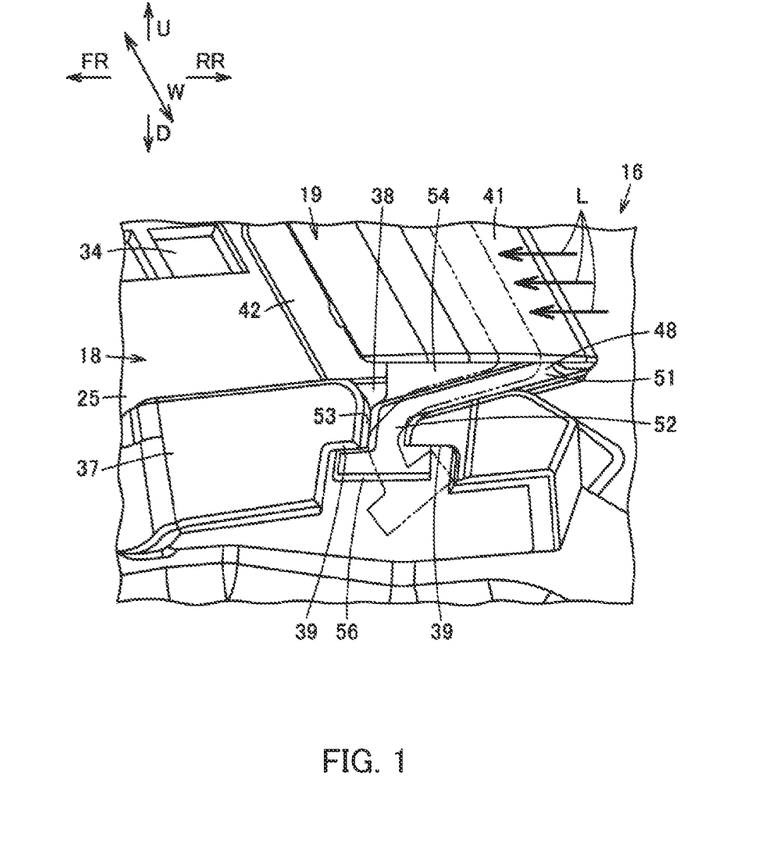
FIG. 1 is a perspective diagram illustrating a part of a cowl cover apparatus according to Embodiment 1 of the present invention.
Figure 2:
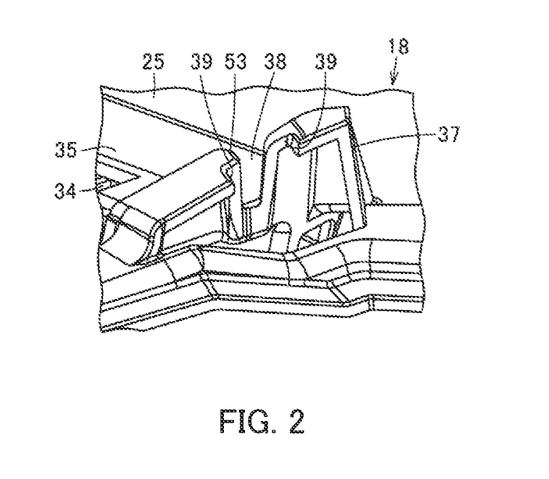
FIG. 2 is a perspective diagram illustrating a part of a cowl cover of the above cowl cover apparatus.

Further, as illustrated in FIGS. 1, 2, and 5, in cover main body 25, wall portion 37 rises in an outer end portion of groove portion 35 in the vehicle width direction. Wall portion 37 is set in an end edge portion of cowl cover 18. Wall portion 37 is formed to extend planarly in the front and rear direction which is a predetermined direction intersecting the vehicle width direction. More specifically, wall portion 37 extends in a direction intersecting with respect to groove portion 35. In wall portion 37, regulation portion 38 that regulates the position of vertical wall body 19, and coming-off prevention portions 39 that prevent vertical wall body 19 from coming off in the vehicle width direction are formed.

Regulation portion 38 is a groove which is formed by notching an upper portion of wall portion 37 and which opens in the vehicle width direction. Vertical wall body 19 is partly inserted into regulation portion 38. Regulation portion 38 thus regulates the position of vertical wall body 19 in the front and rear direction. Regulation portion 38 is formed so as to gradually decrease in width in the front and rear direction from upward to downward. Regulation portion 38 is positioned forward relative to groove portion 35.

Coming-off prevention portions 39 are a portion for preventing vertical wall body 19 from coming off on the side of a center portion in the vehicle width direction. Coming-off prevention portions 39 are formed adjacent to regulation portion 38. Coming-off prevention portion 39 extends planarly in the front and rear direction. Coming-off prevention portions 39 are located on a rear surface side of wall portion 37 when viewed from groove portion 35. More specifically, in Embodiment 1, coming-off prevention portions 39 are located on a side opposite to groove portion 35 in the vehicle width direction with reference to wall portion 37. In Embodiment 1, coming-off prevention portions 39 are formed to extend respectively forward from the front portion of regulation portion 38 and rearward from the rear portion thereof.

Meanwhile, vertical wall body 19 illustrated in FIGS. 1, 4 and 5 rises and is located with respect to cowl cover 18 while being attached to groove portion 35 of cowl cover 18. Vertical wall body 19 is, for example, formed by molding, as a single unit, an elastic and soft synthetic resin, such as, thermal plastic elastomer (TPO) or rubber. Vertical wall body 19 includes a function to prevent foreign matter, moisture, or snow from entering into the engine compartment and a function to absorb a load applied downward to hood 12 in the event of a collision or the like. Vertical wall body 19 is provided longitudinally along the vehicle width direction and detachably attached to groove portion 35 at an upper portion of cover body portion 25. Accordingly, vertical wall body 19 is provided at a position close to the other end portion in the longitudinal direction of cowl cover 18, i.e., at a position close to the other side portion in the vehicle width direction and rises rearward of air inlet 34.

Vertical wall body 19 includes vertical wall main body 41. Vertical wall main body 41 has a substantially constant height and is formed in a wall shape extending in the up and down direction as well as the vehicle width direction. Vertical wall main body 41 is positioned at an upper portion with respect to cover main body 25, and an upper end portion of vertical wall main body 41 is located at a position opposite to and adjacent to a lower surface of hood 12. In Embodiment 1, vertical wall main body 41 is formed such that a portion in the vicinity of and/or of an upper end portion of vertical wall main body 41 gradually curves upwardly forward.

Vertical wall body 19 includes support portion 42. Support portion 42 is a portion for preventing vertical wall body 19 from falling off against the load applied to vertical wall main body 41 from rearward. Support portion 42 is formed in a plate shape extending forward from the front of vertical wall main body 41. Support portion 42 is positioned on a top surface of cover main body 25 in an overlapping manner. Support portion 42 is placed in an extending manner or placed intermittently in the vehicle width direction, which is the longitudinal direction of vertical wall main body 41.

Reinforcement portion 43 for reinforcing vertical wall main body 41 is formed over a space between the front portion of vertical wall main body 41 and support portion 42. Reinforcement portion 43 is a rib extending in the front and rear direction and the up and down direction, for example. In Embodiment 1, a plurality of reinforcement portions 43 are placed apart from each other in the vehicle width direction, which is the longitudinal direction of vertical wall main body 41.

Further, base portion 45 to be inserted into groove portion 35 is provided in a projecting manner in a lower portion of vertical wall main body 41. Base portion 45 is formed in a rib shape extending along the front and rear direction, for example. Base portion 45 is placed in an extending manner or placed intermittently in the vehicle width direction, which is the longitudinal direction of vertical wall main body 41. Base portion 45 includes lock portion 46 formed in a protruding manner to be inserted into an opening portion formed in a bottom of groove portion 35.

Figure 3:
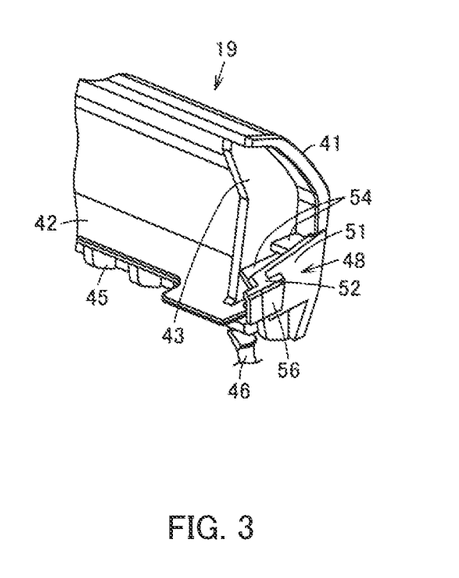
FIG. 3 is a perspective diagram illustrating a part of a vertical wall body of the above cowl cover apparatus.

Furthermore, as illustrated in FIGS. 1 and 3, vertical wall body 19 includes insertion portion 48 which is a lock craw to be partly inserted into regulation portion 38 of cowl cover 18. Insertion portion 48 is positioned on an outer side in the vehicle width direction which is an end portion of vertical wall body 19 in the longitudinal direction. Insertion portion 48 is set in the end portion of vertical wall body 19 in the vehicle width direction. Insertion portion 48 is bent so as to extend along the vehicle width direction on the side of a distal end portion thereof while extending along the front and rear direction on the side of a base end portion thereof. In Embodiment 1, insertion portion 48 includes first arm portion 51 and second arm portion 52 each formed as a part of insertion portion 48. First arm portion 51 is the base end portion of insertion portion 48 while second arm portion 52 is the distal end portion to be inserted into regulation portion 38.

First arm portion 51 is a portion constituting the base end portion of insertion portion 48. First arm portion 51 extends in the front and rear direction. First arm portion 51 protrudes forward from the front portion of vertical wall main body 41.

In Embodiment 1, first arm portion 51 is formed in an inclined planar shape gradually spreading forward outwardly in the vehicle width direction. First arm portion 51 is positioned inward with respect to wall portion 37, that is, is positioned in in an overlapping manner on the side of groove portion 35. First arm portion 51 includes a distal end portion that extends toward a front side edge portion of regulation portion 38 and abuts on the front side edge portion of regulation portion 38 in a state where second arm portion 52 is inserted into regulation portion 38. That is, the front side edge portion of regulation portion 38 serves as abutment portion 53 facing the front end portion that is the distal end portion of first arm portion 51 in the front and rear direction. Abutment portion 53 is formed in a planar shape extending in the vehicle width direction. The front end portion which is the distal end portion of first arm portion 51 is inclined toward regulation portion 38, that is, outward in the vehicle width direction and faces abutment portion 53 in the front and rear direction. Further, first arm portion 51 is coupled to reinforcement portion 43 and vertical wall main body 41 by coupling portion 54. In Embodiment 1, coupling portion 54 is formed in a rib shape along the vehicle width direction.

Second arm portion 52 is a portion constituting the distal end portion of insertion portion 48. Second arm portion 52 includes a cross sectional shape that fits to regulation portion 38. Second arm portion 52 is formed so as to extend from the front end portion which is the distal end portion of first arm portion 51 in a bent shape outward in the vehicle width direction. Second arm portion 52 is bent to have a shape with an obtuse angle with respect to first arm portion 51. More specifically, the angle formed by first arm portion 51 and second arm portion 52 is set to be greater than 90 degrees. Second arm portion 52 is inserted into regulation portion 38 and regulated in its position in the front and rear direction. The distal end portion of second arm portion 52 extends outward in the vehicle width direction relative to regulation portion 38.

Stopper portion 56 is formed in the distal end portion of second arm portion 52. Stopper portion 56 is a portion constituting the distal end portion of insertion portion 48. Stopper portion 56 extends from the distal end portion of second arm portion 52 in the front and rear direction. Therefore, stopper portion 56 is formed to be wider in the front and rear direction than regulation portion 38. Stopper portion 56 is positioned opposite to groove portion 35 with respect to wall portion 37, that is, is positioned outside of wall portion 37 in a state where second arm portion 52 is inserted into regulation portion 38. In Embodiment 1, stopper portion 56 extends in both of the front and rear sides with respect to second arm portion 52. For this reason, the distal end portion of insertion portion 48 is formed in a T-shape. Stopper portion 56 is positioned such that a lateral portion of stopper portion 56 on an inner side of the vehicle width direction, that is, on the side adjacent to second arm portion 52 is positioned facing coming-off prevention portion 39 in the vehicle width direction near or in an overlapping manner with coming-off prevention portion 39 in a state where second arm portion 56 is inserted into regulation portion 38. Further, an open space where no cowl cover 18 is present is formed on the outer side of stopper portion 56 in the vehicle width direction.

Cowl cover apparatus 16 is assembled by locking vertical wall body 19 to cowl cover 18.

More specifically, base portion 45 and lock portion 46 of vertical wall body 19, and second arm portion 52 of insertion portion 48 are positioned with respect to groove portion 35, the opening portion, and regulation portion 38 of cowl cover 18. Vertical wall body 19 is then pushed downward from above into cowl cover 18. Base portion 45 and lock portion 46 of vertical wall body 19, and second arm portion 52 of insertion portion 48 are respectively inserted into groove portion 35, the opening portion, and regulation portion 38 of cowl cover 18, thereby, attaching vertical wall body 19 to cowl cover 18. In other words, vertical wall body 19 is easily attached to cowl cover 18 by positioning and pushing with one touch.

In this state, vertical wall main body 41 of vertical wall body 19 rises upward with respect to cover main body 25 of cowl cover 18, and in the position where support portion 42 of vertical wall body 19 overlaps on top of cover main body 25 of cowl cover 18, the position of vertical wall body 19 in the front and rear direction is regulated by second arm portion 52 of insertion portion 48 fitted to regulation portion 38 and the position of vertical wall body 19 in the vehicle width direction is regulated by stopper portion 56 fitted to coming-off prevention portion 39.

Cowl cover apparatus 16 in which vertical wall body 19 is attached to cowl cover 18 is attached to a vehicle body such that the front edge of front glass 14 is held between cover main body 25 and holding portion 26.

As described above, cowl cover apparatus 16 prevents water from entering into vehicle interior 13 with cowl cover 18 covering cowl portion 15 and prevents hot air and/or order from being taken into vehicle interior 13 via air inlet 34 by hood seal 31 deforming and coming into tight contact with hood 12, and thereby blocking the hot air and/or order from engine compartment 11 in a closed state. In addition, vertical wall body 19 comes close to hood 12 in a closed state, thereby preventing foreign matter, moisture, or snow or the like from entering into engine compartment 11.

When snow is accumulated on a rear part, which is an upper side of vertical wall body 19, for example, a load in the front and rear direction is applied to vertical wall body 19 as indicated by arrows L in FIG. 1. This load generates a force that makes first arm portion 51 slide along wall portion 37 to move forward along wall portion 37, and the front end portion of first arm portion 51 thus abuts on abutment portion 53 positioned opposite to and in front of the front end portion of first arm portion 51, resulting in generating a reaction force on in insertion portion 48 of vertical wall body 19. For this reason, in vertical wall body 19 formed of a soft material compared with cowl cover 18, first arm portion 51 of insertion portion 48 elastically deforms outward in the vehicle width direction so as to slide into regulation portion 38 due to a reaction force from abutment portion 53, and because of separation of stopper portion 56 from coming-off prevention portion 39 after movement of second arm portion 52 from regulation portion 38 outward in the vehicle width direction as indicated by dashed-two dotted lines in FIG. 1, the load can be released outward in the vehicle width direction while insertion portion 48 remains inserted in regulation portion 38.

When the load onto vertical wall body 19 is released by snow removal and/or the like, first arm portion 51 deforms to restore the original fitting state in which second arm portion 52 is positioned within regulation portion 38 and stopper portion 56 is positioned close to or abuts on coming-off prevention portion 39 in insertion portion 48 of vertical wall body 19.

As described above, according to Embodiment 1, partly inserting insertion portion 48 located in the end portion of vertical wall body 19 in the vehicle width direction into regulation portion 38 of cowl cover 18 regulates the position of insertion portion 48 in the front and rear direction by regulation portion 38. Thus, the quality of locking between cowl cover 18 and vertical wall body 19 is secured in the ordinary installation state, and when a load is applied to vertical wall body 19 in the front and rear direction, insertion portion 48 elastically deforms in the vehicle width direction due to the reaction force from cowl cover 18. The load can be thereby released in the vehicle width direction while insertion portion 48 remains inserted into regulation portion 38 in vehicle width direction. For this reason, it can be made harder for vertical wall body 19 to come off of cowl cover 18, and in the state where the load is released, deformation of insertion portion 48 for restoration allows cowl cover 18 and vertical wall body 19 to be re-locked with each other. Accordingly, even after repeated snow accumulation and its removal, insertion portion 48 is unlikely to deform with time, and the visual quality and the locking of vertical wall body 19 with respect to cowl cover 18 can be kept for a long time.

Insertion portion 48 is formed by first arm portion 51 extending in the front and rear direction and second arm portion 52 extending from the end portion of first arm portion 51 in the vehicle width direction, and coming-off prevention portion 39 and abutment portion 53 are formed in cowl cover 18. Coming-off prevention portion 39 faces stopper portion 56 of second arm portion 52 in the vehicle width direction, and abutment portion 53 is a portion on which the end portion of first arm portion 51 abuts in the front and rear direction. As a result, when a load is applied forward onto vertical wall body 19, first arm portion 51 abuts on abutment portion 53 and due to the reaction force of the abutment, first arm portion 51 is taken into regulation portion 38 while elastically deforming in the vehicle width direction, and stopper portion 56 separates from coming-off prevention portion 39, thereby, making it possible to effectively release the load.

In particular, the front end portion of first arm portion 51 is inclined outward in the vehicle width direction and facing abutment portion 53 in the front and rear direction. Thus, when a load is applied forward onto vertical wall body 19, the reaction force from abutment portion 53 makes first arm portion 51 easily deform so as to be easily taken into regulation portion 38.

Figure 7:
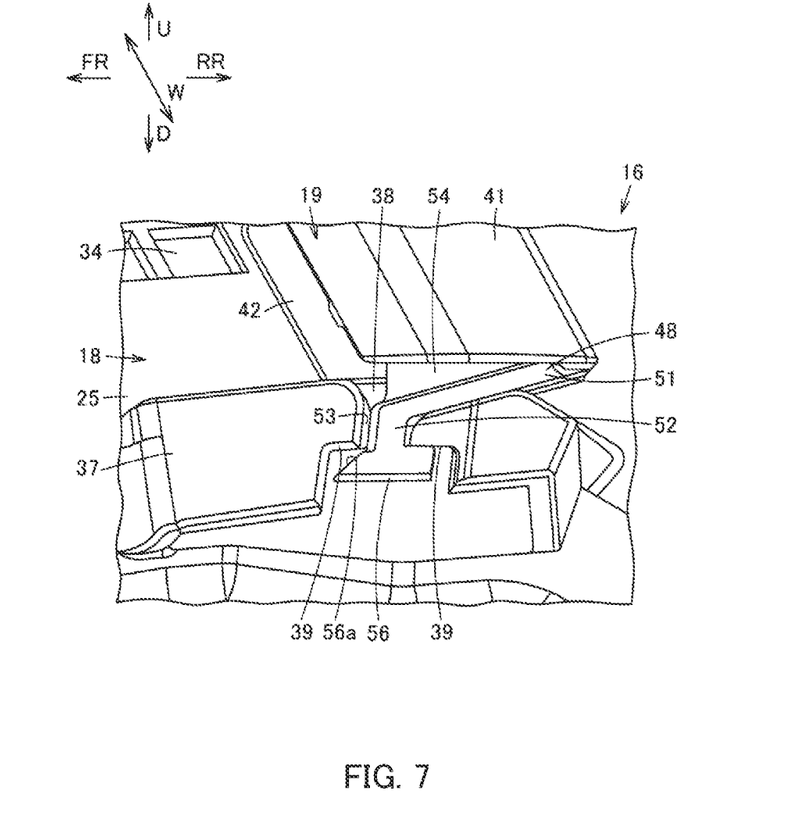
FIG. 7 is a perspective diagram illustrating a part of a cowl cover apparatus according to Embodiment 2 of the present invention.

Note that, as in Embodiment 2 illustrated in FIG. 7, a lateral portion of stopper portion 56 on the side of regulation portion 38 may be formed as inclined portion 56a which is inclined so as to be gradually separated from regulation portion 38 forward from second arm portion 52. More specifically, stopper portion 56 may be formed in a tapered shape that gradually decreases in thickness in the vehicle width direction as the shape extends forward from second arm portion 52. In this case, when a load is applied from forward onto a vehicle body due to a collision with an obstacle, for example, vertical wall body 19 easily comes off from cowl cover 18, thereby making it possible to suppress a reaction force against the obstacle.

In each of the embodiments described above, cowl cover apparatus 16 may be provided on a portion other than the front portion of vehicle body 10 and placed while covering a cowl portion between a rear glass serving as a windshield, and a (rear) compartment, for example.

INDUSTRIAL APPLICABILITY

The present invention is applicable to cowl covers covering cowl portions between front glasses and engine compartments of automobiles, for example.

REFERENCE SIGNS LIST

15 Cowl portion
16 Cowl cover apparatus
18 Cowl cover
19 Vertical wall body
38 Regulation portion
39 Coming-off prevention portion
48 Insertion portion
51 First arm portion
52 Second arm portion
53 Abutment portion
56 Stopper portion

What is claimed is:

1. A cowl cover apparatus, comprising:
a cowl cover that covers a cowl portion; and
a vertical wall body detachably attached to the cowl cover, the vertical wall body being positioned while rising with respect to the cowl cover in a state of being attached to the cowl cover, wherein
the vertical wall body includes an insertion portion in an end portion of the vertical wall body in a vehicle width direction, and
the cowl cover includes a regulation portion into which the insertion portion is partly inserted in the vehicle width direction, wherein
the insertion portion is formed to be elastically deformable in the vehicle width direction due to a reaction force from the cowl cover against a load onto the vertical wall body in a predetermined direction intersecting the vehicle width direction.

2. The cowl cover apparatus according to claim 1, wherein the insertion portion includes:
a first arm portion extending in a predetermined direction intersecting the vehicle width direction; and
a second arm portion extending from an end portion of the first arm portion in the vehicle width direction to be placed into the regulation portion, wherein
the second arm portion includes a stopper portion extending from a distal end portion of the second arm portion in a front and rear direction, and wherein
the cowl cover includes:
a coming-off prevention portion facing the stopper portion in the vehicle width direction, and
an abutment portion facing an end portion of the first arm portion in the predetermined direction.

3. The cowl cover apparatus according to claim 2, wherein the end portion of the first arm portion is inclined in the vehicle width direction toward the regulation portion and faces the abutment portion in the predetermined direction intersecting the vehicle width direction.

4. The cowl cover apparatus according to claim 2, wherein the stopper portion is formed to extend laterally in the predetermined direction intersecting the vehicle width direction with respect to the distal end portion of the second arm portion, and a lateral portion of the stopper portion on a side of the regulation portion is inclined so as to gradually separate from the regulation portion toward the predetermined direction from the second arm portion.

* * * * *